United States Patent
Llorente González et al.

(10) Patent No.: US 8,123,883 B2
(45) Date of Patent: Feb. 28, 2012

(54) METHOD OF PRODUCING LARGE HOLLOW PARTS BASED ON COMPOSITE MATERIALS

(75) Inventors: José Ignacio Llorente González, Pamplona (ES); Sergio Velez Oria, Pamplona (ES)

(73) Assignee: Gamesa Innovation & Technology, S.L., Zamudio (Vizcaya) (ES)

( * ) Notice: Subject to any disclaimer, the term of this patent is extended or adjusted under 35 U.S.C. 154(b) by 1002 days.

(21) Appl. No.: 11/921,613

(22) PCT Filed: Jul. 14, 2006

(86) PCT No.: PCT/ES2006/000406
§ 371 (c)(1),
(2), (4) Date: Dec. 5, 2007

(87) PCT Pub. No.: WO2007/010064
PCT Pub. Date: Jan. 25, 2007

(65) Prior Publication Data
US 2009/0114337 A1 May 7, 2009

(30) Foreign Application Priority Data

Jul. 15, 2005 (ES) .................. 200501729

(51) Int. Cl.
*B32B 37/10* (2006.01)
(52) U.S. Cl. .......... 156/87; 156/171; 156/173; 156/193; 156/285
(58) Field of Classification Search ................ 156/171, 156/173–175, 193–195, 245, 285–286, 87; 416/229 R, 230; 264/257–258
See application file for complete search history.

(56) References Cited

U.S. PATENT DOCUMENTS

| | | | | |
|---|---|---|---|---|
| 4,248,649 A * | 2/1981 | Harrison et al. | ............... | 156/174 |
| 4,622,091 A * | 11/1986 | Letterman | ..................... | 156/286 |
| 4,684,423 A * | 8/1987 | Brooks | ........................ | 156/156 |
| 4,915,590 A * | 4/1990 | Eckland et al. | ............... | 416/225 |
| 5,170,967 A * | 12/1992 | Hamamoto et al. | .......... | 244/119 |
| 5,242,267 A * | 9/1993 | Byrnes et al. | ............. | 416/134 A |
| 5,746,553 A * | 5/1998 | Engwall | ...................... | 409/132 |
| 7,517,194 B2 * | 4/2009 | Doorenspleet et al. | ... | 416/204 R |
| 7,530,168 B2 * | 5/2009 | Sorensen et al. | ........... | 29/889.21 |
| 2002/0164251 A1* | 11/2002 | Sehgal et al. | ............. | 416/134 A |
| 2004/0032062 A1* | 2/2004 | Slaughter et al. | ............ | 264/511 |
| 2005/0106029 A1* | 5/2005 | Kildegaard | ............... | 416/229 R |
| 2007/0274835 A1* | 11/2007 | Stiesdal | ........................ | 416/230 |

FOREIGN PATENT DOCUMENTS

| | | |
|---|---|---|
| EP | 0 525 263 | 2/1993 |
| EP | 0 807 504 | 11/1997 |
| ES | 2 249 182 | 3/2006 |
| WO | 2004/078465 | 9/2004 |
| WO | 2006/070171 | 7/2006 |
| WO | WO 2006070171 A1 * | 7/2006 |

* cited by examiner

*Primary Examiner* — Katarzyna Wyrozebski Lee
(74) *Attorney, Agent, or Firm* — Ladas & Parry LLP

(57) ABSTRACT

The invention relates to a method of producing large parts based on composite materials, such as the roots of blades for wind generators. The inventive method comprises the following steps consisting in: helically winding a band of fibre- and resin-based composite material around a mould; applying a removable protective sheet to the surface of the body; applying a heat-shrinkable strip to the sheet; compacting the laminate thus formed under a vacuum; curing the resin; aligning the cured body, machining the transverse surface to be applied to the blade and forming axial housings in said surface; and positioning and affixing inserts in the axial housings in order to secure the blade.

11 Claims, 3 Drawing Sheets

METHOD OF PRODUCING LARGE HOLLOW PARTS BASED ON COMPOSITE MATERIALS

FIELD OF THE INVENTION

The invention relates to a method of producing large parts based on composite materials, and is especially applicable to the manufacture of the roots of blades for wind generators.

More specifically, the inventive method includes helically winding a band of fibre- and resin-based composite material around a mould and finally subjecting it to a curing operation.

BACKGROUND OF THE INVENTION

The known methods for manufacturing large parts based on composite materials are generally based on the use of continuous fibres impregnated with resin, which are wound around a mandrel or mould. In this sense we can indicate for example the U.S. Pat. No. 5,993,717, related to a procedure for manufacturing reinforced composite profiles, with open or closed sections, in which the reinforcing fibres pass through a resin bath, together with reinforcing threads or rods, to then penetrate into a mould where the profile is shaped and cured.

In the same sense we can cite the EP 1056587, related to the manufacture of floating bodies from reinforced synthetic resins with continuous fibres and made with winding machines.

The manufacture of large resin parts is also known, where the reinforcement elements consist of bands or strips of fibres. In this sense we can cite the ES 2089965, related to a procedure for manufacturing aerodynamic profiles for wind turbine blades, which consists in coating moulds with complexes of fibres impregnated with synthetic resins, later combining all the covered moulds. The fibre complexes can be shaped on the moulds, for example based on stratified layers of reinforced fibres, supplied in strips with single-direction fibres that are preimpregnated with synthetic resins. Also in this case the fibres are preimpregnated and, in addition, the strips or bands of fibres are extended across the mould and the mould forms part of the profile that you wish to obtain.

DESCRIPTION OF THE INVENTION

The object of this invention is to be able to obtain large parts using complex materials, based on reinforcing fibres and resins, in which the reinforcing fibres comprise bands of undefined length, which are applied to a mould, on which the curing takes place and from which the part to shape is separated, obtained only with the complex material and without other supporting or reinforcing elements being part of it.

According to a first characteristic of the invention, the parts are shaped on a mould, by helically winding a band of complex material around this mould, until achieving the desired laminate.

This winding can be performed with the mould in a winding machine, which can rotate the mould along its axis, while the spools of the band of complex material move linearly in a carriage, parallel to the mould.

The laminate of the part is achieved by combining the linear movement of the spool carriage and the turning movement of the mold along its axis. Thus, with successive sweeps, you can achieve the required laminate thickness on every area or section of the mold by regulating the length of each sweep. While the laminate is being formed, the band is maintained at a homogenous tension, to avoid wrinkling.

According to another characteristic of the invention, the band of complex material consists of a stratification formed by alternate layers of fibre and resin strips. These bands will preferably be composed of two external layers of fibre and an intermediate layer of resin. The resin will be in solid state until the moment it is used, so the band must be kept at temperatures lower than 5° C. To apply the band to the mould, this band must be heated to a temperature of between 15 and 20° C., so the resin reaches a doughy or semi-liquid state.

Before starting to wind the band, the surface of the mould must be prepared by cleaning it, applying a demoulding agent and placing thermocouples to verify temperatures in the subsequent stage of curing the resin.

Once the laminate is complete, the whole surface is covered with a removable protective sheet. This sheet may be a band that is wound helically around the laminate, with the longitudinal edges partially overlapping and tensed so that it fits over the surface of the laminate. The protective sheet has a double function, on one hand it protects the laminate from dirt and, on the other, makes the surface of the laminate rough enough for the layers applied in later operations to adhere correctly, as indicated below.

Then a heat-shrinkable strip is wound helically around the protective sheet, tensed and with the longitudinal edges partially overlapping, forming a continuous cover through which passages are formed to evacuate the air and let the resin sweat, passages that may be achieved by placing a strip of permeable material between certain successive turns of the band, transversally to it.

Then it is compacted under a vacuum, using a process that is known in itself, that may include the successive use of a bleeder; an aerator, constituted by a layer of absorbent material, which will be responsible for absorbing the resin that the laminate may sweat through the joints of the bleeder and its edges; and a vacuum cover or bag that covers the whole lateral surface of the assembly and is sealed.

Between the bleeder and the vacuum bag, intercommunicated longitudinal and transversal vacuum passages are formed through which the air can be extracted. Also on the layer of absorbent material, before forming the vacuum bag, thermocouples and tubes to extract air will be placed, tubes that start in the vacuum passages, pass over the layer of absorbent material and leave through the end sections. In addition, a tube passes through the vacuum and will be connected to a vacuum gauge at a later stage when the vacuum is created, by connecting the air extraction tubes to a vacuum pump. The seal of the plastic sheet that shapes the vacuum bag, between its edges and with the layer of absorbent material and the seal where the thermocouples and air extraction tubes exit, may be chromed.

After achieving the degree of vacuum inside the vacuum bag, the curing of the laminate resin begins, maintaining the compacting due to the vacuum and applying heat to the exterior of the shaped body and also to the interior, through the mould. This may be done inside a curing oven, monitoring the temperature with the thermocouples that had previously been fitted, which enables the curing stage to be carried out independently from the interior and exterior of the laminate, controlling the curing from the inside out.

Once the resin has been cured and after the assembly has been removed from the curing oven, the vacuum bag, the layer of absorbent material with the air passages, thermocouples and vacuum or air extraction tubes are removed, to finally demould the body. To do this and to remove the excess material formed during the lamination on the side with the greatest section, two peripheral cuts will be made close to the greatest end section, which reach the mould and establish two rings, one at the end, which is separated by axial cuts for example to subdivide the ring into two or more separable sectors, and an intermediate ring that will rest on fixed supports while the mould is removed by pushing axially from the side opposite this ring. Thus the demoulding is carried out by acting on the mould, moving it with respect to the body or laminate obtained, which rests on fixed transverse supports, through the intermediate ring. When the mould is removed, this intermediate ring is released and separated from the moulded body.

So that the transverse cuts on the moulded body to obtain these rings do not affect or reach the surface of this mould, a peripheral channel is formed on the surface of the mould, near the end section. The channel shall be a little wider than the separation between the cuts that establish the rings and shall coincide with the position where these cuts are made. In this channel, before starting to wind the band of composite materials, a soft filler material is placed, such as cork, which will be covered with a impervious sheet that is flush with the lateral surface of the mould. Thus, when making the transverse peripheral cuts in the moulded body, the cutter may exceed the thickness of this without affecting the mould, as it will hit the cork filler of the peripheral channel.

Then, the moulded body is subjected to an alignment process and the transverse surface to be abutted to the blade is machined, to obtain a flat surface perpendicular to the axis of the body. Axial housings are made in this surface and inserts are placed into them and affixed, for securing to the blades.

The aforementioned axial housings are obtained by machining in several stages to achieve a conical internal section and a cylindrical external section.

The inserts will be tubular, with an external shape and section that coincide with the inserts.

The laminating operation and at least the operations after the shaping of this laminate, such as the stages of vacuum, curing, demoulding, aligning, machining and affixing inserts, are performed at fixed or different work stations, to which the mould will be successively transported. This allows different operations to be performed at different work stations at the same time.

BRIEF DESCRIPTION OF THE DRAWINGS

The characteristics of the invention procedure can be understood better with the following description of an example, with reference to the attached drawings, where.

DETAILED DESCRIPTION OF A METHOD

Figure 1:
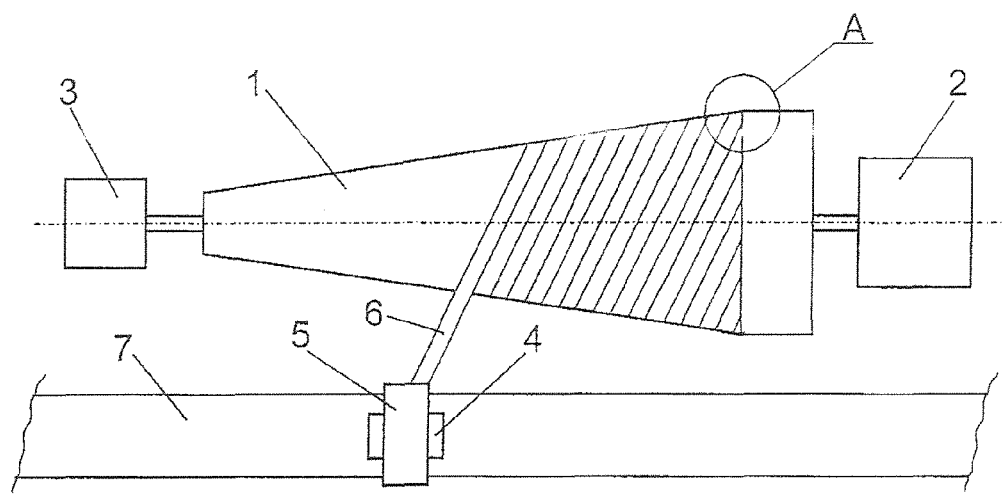
FIG. 1 shows a plan view diagram of an installation for the helical winding of laminate strips around the mould where the laminate is shaped.

The example represented in the drawings corresponds to the manufacture of a root of a wind turbine blade, with a tubular structure, which is obtained from a mould that is also tubular. To obtain this part, start by fitting the mould 1, FIG. 1, onto a winding machine, between a jaw chuck 2 and a counterpoint 3. This model also includes a carriage 4 that can carry spools 5 of a band of composite material 6, with which the root will be laminated. The carriage 4 can move linearly along a base 7 parallel to the axis of the mould 1.

Combining the rotation of the axis 1 with the linear movement of the carriage 4, the band 6 is wound helically around the mold 1, achieving the thickness of laminate required for each area or section of the mold. The band 6 will be maintained with a uniform tension to avoid wrinkling and to achieve a homogenous laminate.

The band 6 of composite material will be made up of a stratification formed by two layers of fibre with a layer of resin between them.

Figure 2:
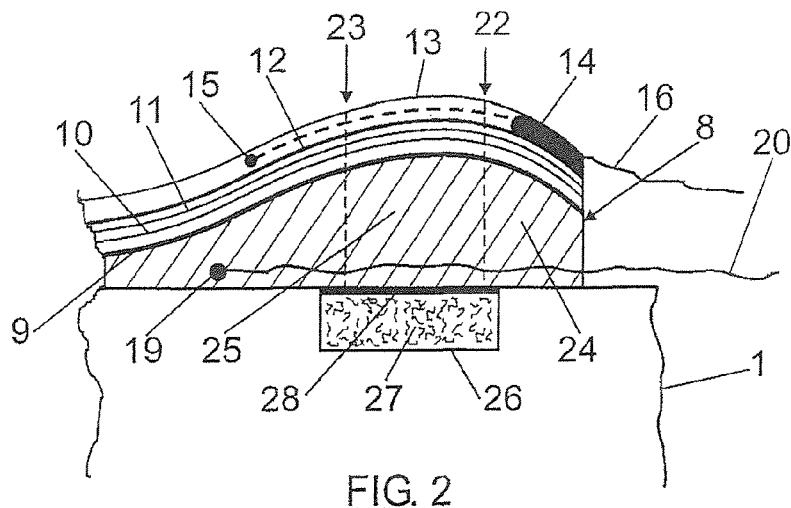
FIG. 2 corresponds to Detail A of FIG. 1, in section, once the process of shaping the laminate has finished, with the vacuum bag and before the curing process.
Figure 3:
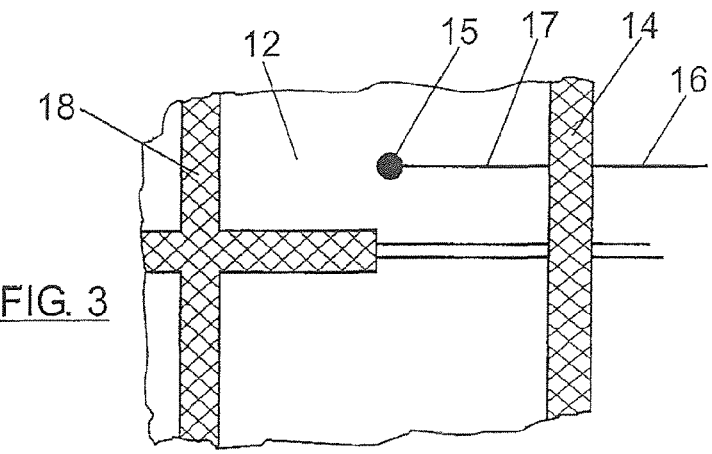
FIG. 3 shows a plan view of the assembly in FIG. 2, with the vacuum bag.

After winding the band 6, a stratification is obtained, which is indicated in FIG. 2 with the number 8. On this stratification, keeping it on the mould 1, a removable protective sheet 9 is applied, which shall be porous to resin but shall prevent dirt reaching the surface of the stratification 8. A heat-shrinkable strip is wound helically around this protective sheet to form a continuous cover 10, which will help the compacting of the laminate 8 in the later curing process. As this strip is not porous, discontinuities are created at certain points, for example by alternating with strips of permeable material, which create passages through which air can pass and the resin can sweat.

A bleeder 11 is placed on this cover, constituted by a sheet of plastic with small holes that do not let the resin through, but do let air pass. The bleeder is later covered with an aerator 12, constituted by a layer of absorbent material, for example a blanket of non-woven fibre. The bleeder will be responsible for absorbing the resin that may be sweated by the laminate through the joints of the bleeder and its edges.

Finally, a vacuum bag 13 is formed on the bleeder 11, made up of an impervious sheet placed around the bleeder 11, with the longitudinal edges sealed together and the transverse edges sealed to the bleeder 11 with a sealant 14 applied adjacent to the transverse sections of the assembly.

Between the vacuum bag 13 and the bleeder 11 there are thermocouples 15 having cables 16 that can exit through the layer of sealant 14. Also between the bag 13 and the bleeder 11 there are air extraction tubes 17 that may also protrude through the sealant 14. The tubes 17 leave from passages 18 formed between the bleeder 11 and the bag 13 that pass longitudinally and peripherally and are connected together. These passages 18 can be formed, for example, by strips of mesh positioned on the blanket that forms the bleeder 11.

As you can see in FIG. 2, before starting to wind the band 6, thermocouples 19 are fitted on the mould 1. The conductors 20 exit towards the same side as the conductors 16 of the thermocouples 15.

Thus the bag 13 is fully sealed against the bleeder 12 and a tube passes through an intermediate point, not represented, that ends inside between this bag and the bleeder 12. It is connected to a vacuum gauge on the outside, to monitor the degree of vacuum that is created inside the bag 13 when the tubes 17 are connected to a vacuum pump. Once the minimum vacuum required has been reached, the mould 1 with the body shaped on it using the laminate 8, the different layers described and the vacuum bag is transported to a curing oven, where heat is applied to the exterior of the body and also to the interior through the mould 1, monitoring the temperature using thermocouples 15 and 19, to achieve independent interior and exterior curing.

Figure 4:
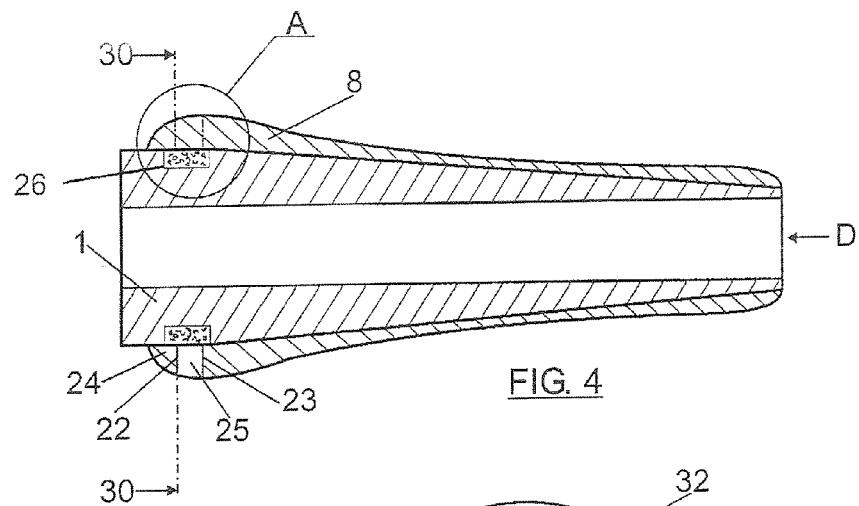
FIG. 4 is a diametral section of the mould with the laminate or shape on it, in a stage prior to demoulding.
Figure 5:
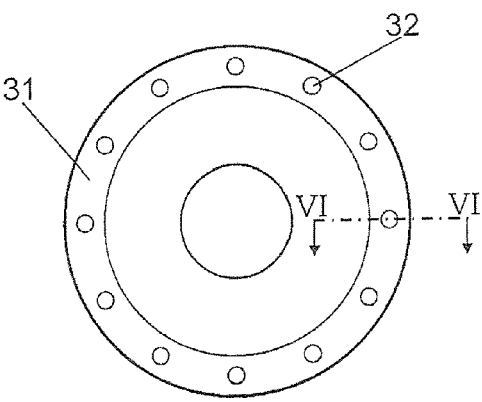
FIG. 5 is a profile view of the laminate, after removing the mould, seen from its larger base.

After the curing you have an assembly like that represented in FIG. 4, which includes the mould 1 and the laminate 8 with the aforementioned layers. Then it is necessary to proceed to the demoulding, for which the mould with the laminate is moved to a cutting and demoulding machine, the auxiliary materials that help the curing, such as the vacuum bag, the layer of absorbent material with the air passages 18, thermocouples 15 and vacuum or air extraction tubes 17 are removed. Then it will be necessary to remove the excess material formed on the side with the greater section during the laminating. To do this, two transverse cuts 22 and 23 are made all around the body 8, near the end section with the bigger diameter, cuts that must go through the whole thickness of the body 8 and that establish an end ring 24 and an intermediate ring 25.

To avoid damaging the surface of the mold 1 when making the cuts 22 and 32, there is a peripheral channel 26, FIGS. 2 and 4, in the area of the cuts, which is filled with a soft material such as cork 27 before starting to helically wind the band 6. The filler material 27 is covered with an impervious sheet or layer 28 flush with the surface of the mold 1. Thus the cutting points 22 and 23, as you can see in FIG. 2, can exceed the height corresponding to surface of the mold 1, partially penetrating the filler material 27, which allows all the cuts to be made safely and rings 24 and 25 to be formed ready for demoulding process, as described below.

For the demoulding, axial cuts are made in the external ring 24, so that it comprises two or more sectors that can be easily separated from the mould 1. Then the intermediate ring 25 is supported by means of its flat surface on fixed position limiters 30 and the mould 1 is pushed in the direction of arrow D, thus easily managing to demould the part and, during this operation, removing ring 25.

Once the part is demoulded, it is necessary to obtain, on the side with the greatest section, a flat surface perpendicular to the axis of the part. For this purpose the demoulded part is transported to an alignment station, where the part is oriented to the correct position, where it is immobilised. Then the transverse surface 31 that corresponds first with cut 23 is machined until a flat surface perpendicular to the axis of the body 8 is obtained. Next, in surface 31, axial housings 32 are formed for inserts 33 to be placed and affixed, which are for securing the body or root 8 in the blade of the wind turbine.

To place the inserts, adhesive is applied to them and once the axis of the housing and the insert are aligned, the inserts 33 are inserted into the housings 32 by means of a continuous rotational movement, which prevents air bubbles forming, filling the whole space that may be between the housing 32 and the insert 33 with adhesive 34. In addition, adhesive 35 is also applied around the insert 33 and this adhesive is cured by moving the part to a curing oven. The curing temperature can be monitored by a thermocouple previously inserted into insert 33 using stoppers. Once the resin is cured, the stoppers and the Thermocouple are removed.

Once this process is finished it is time to face the inserts 33. For this purpose the part is moved to a face milling machine and, once fitted on the bedplate, the insert that protrudes most is selected, to establish a starting point for the face milling. Then the face milling is begun, with as many sweeps as necessary until the surface all the inserts are all on the same plane, perpendicular to the axis of the body.

With the aforementioned process, you now have a part that forms the root of the blade, with a structure that is resistant enough for the role it must fulfil. As a process verification, a test of traction and of the thread of the inserts 33 can be carried out.

Figure 7:
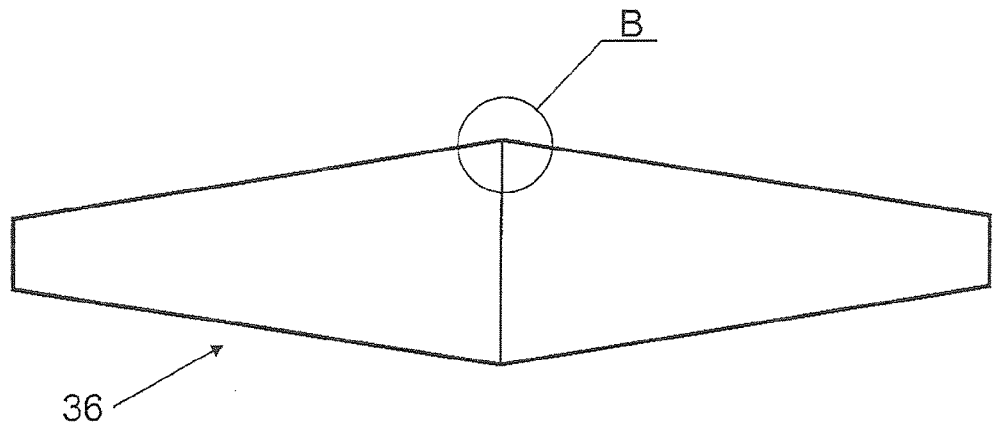
FIG. 7 is a front lateral view of the shaped laminate on the mould, according to a variation of execution.
Figure 8:
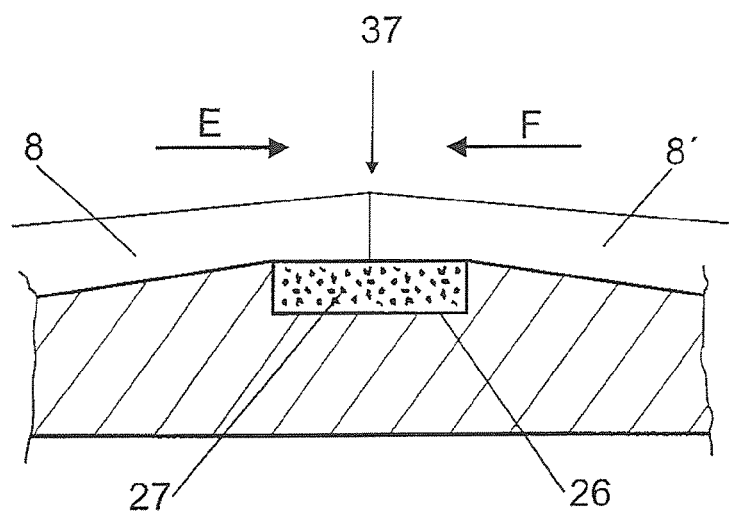
FIG. 8 corresponds to Detail B of FIG. 7, in section and at a greater scale.

It is possible to make the whole process of shaping the laminate or body 8 on a symmetrical mould 36, FIG. 7, equivalent to two moulds 1 as in FIG. 1 joined at the larger base. In this case the channel 26, FIG. 8, shall be made to coincide with the intermediate area of the mould and it shall also be filled with cork 27 or similar. Only one peripheral cut shall be made 37, through which an element will be inserted which can push in directions E or F of FIG. 8 to demould the bodies 8 and 8' shaped on it.

Figure 6:
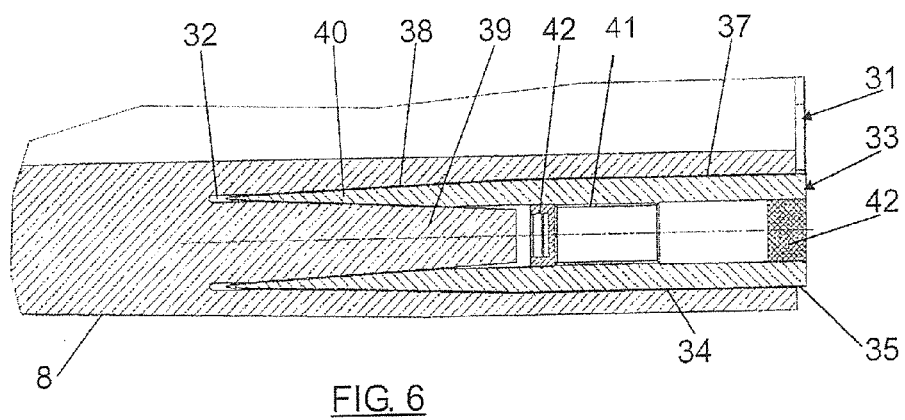
FIG. 6 is a partial longitudinal section of the wall of the laminate, taken according to the cutting point VI-VI in FIG. 5.

As you can see in FIG. 6, the housings 32 for the inserts 33 may include an external cylindrical section 37 and an internal conical section 38, decreasing towards the bottom. A conical coaxial core 39 protrudes from this base, with a decreasing section that limits a ring-shaped space with the wall of the housing. For its part, the insert 33 is tubular, which coincides with the housing, and has a section 40 in which the wall is thinner, to fit into the aforementioned ring-shaped space, between the wall of the housing 32 and the core 39.

The housings 32 are machined in successive operations, to obtain cylindrical 37 and conical 38 sections.

The insert 33 will also include an internal threaded section 41 that can be protected with stoppers 42 until the moment of assembly.

The invention claimed is:

1. A method of manufacturing large parts from composite materials, for manufacture of roots of blades for wind turbines, which includes shaping the root by applying fiber and resin-based composite materials to a mold and then curing, comprising the steps of:
   a) winding a tensioned band of fiber and resin-based composite material helically around the mold in successive sweeps, to achieve a shaped laminated body of the desired thickness on all areas of the mold;
   b) applying a removable protective sheet that is porous to resin to the whole surface of the shaped laminated body;
   c) applying a heat-shrinkable strip to the protective sheet, continuously covering the whole protective sheet;
   d) compacting the shaped laminated body by vacuum;
   e) curing the resin, wherein the curing is independent from the interior and exterior of the shaped laminated body on the mold, maintaining control of the curing from the inside out, by applying the heat to the exterior of the shaped laminated body and through the mold and per controlling the temperatures by means of thermocouples previously fitted in the shaped laminated body, maintaining the compaction by vacuum to obtain a cured body, and then demolding the cured body;
   f) aligning the cured body and machining the transverse surface to be abutted to the blade, to achieve a flat surface perpendicular to the axis of the cured body, where some axial housings are formed; and
   g) placing and affixing inserts in the axial housings, for securing the cured body to a blade.

2. The method according to claim 1, wherein at least some of the steps of the method are carried out at different fixed stations, to which the mold is successively transported within the laminate body.

3. The method according to claim 1, wherein the band of composite material comprises two layers of fiber, between which there is a layer of resin and the band is obtained by a stratification of said layers.

4. The method according to claim 1, wherein a cover formed by the heat-shrinkable strip forms passages for extraction of air.

5. The method according to claim 4, wherein said passages are obtained by alternating strips of permeable material between some successive layers of the heat-shrinkable strip.

6. The method according to claim 1, wherein the mold on which the shaped laminated body is formed reproduces a shape of the element to be obtained, and the shaped laminated body determines an excess of material on the side with a greater section, that is removed by one or more peripheral cuts, that establish separable rings.

7. The method according to claim 1, wherein the mold on which the shaped laminated body is formed reproduces a shape of two elements to be obtained, adopting a symmetrical configuration with respect to a middle transverse plane that is the same as a greater section of the two elements to be obtained, where a peripheral cut is made to separate the two shaped elements.

8. The method according to claim 6, wherein the mold has, near the greater section coinciding with the area where the transverse cuts are in the molded body, a peripheral channel, and around this, before starting the winding of the band of composite materials, a soft filler material is placed and covered with an impervious sheet that is flush with the lateral surface of this mold, making the peripheral cuts coincide axially with said peripheral channel.

9. The method according to claim 1, wherein the axial housings for the inserts are machined in several stages to achieve a cylindrical external section and a conical internal section, decreasing towards the bottom, a conical coaxial core protrudes from this base, with a decreasing section that limits a ring-shaped space with the wall of the housing that decreases towards the bottom; and wherein the insert has a tubular structure, with an external diameter that coincides with the internal diameter of the housing, having a wall that is an internal section of decreasing thickness, that can be housed in the ring-shaped space of the housing.

10. The method according to claim 1, wherein
the inserts are placed and affixed by the application of a resin to their lateral surface,
the inserts are aligned with the axial housings and are introduced into the housings with a continuous gradual rotational movement, letting the inserts protrude partially,
after a resin is applied around the part of the inserts that protrude, the resin is cured,
the inserts are faced milled until their free transverse surface is located on the same plane perpendicular to the axis of the body.

11. The method according to claim 7, wherein the mold has a peripheral channel near the greater section coinciding with the area where the transverse cuts are located in the molded body, and around said peripheral channel, before starting the winding of the band of composite materials, a soft filler material is placed and covered with an impervious sheet that is flush with the lateral surface of the mold, making the peripheral cuts coincide axially with said peripheral channel.

* * * * *